(12) United States Patent
Braverman et al.

(10) Patent No.: US 11,608,808 B2
(45) Date of Patent: Mar. 21, 2023

(54) EFFECTIVE WAVE POWER PLANT FOR PRODUCTION OF CLEAN ELECTRICITY OR CLEAN WATER FROM THE WAVES OR A COMBINED SYSTEM

(71) Applicant: ECO WAVE POWER LTD, Tel Aviv (IL)

(72) Inventors: Inna Braverman, Akko (IL); David Leb, Panama (PA)

(*) Notice: Subject to any disclaimer, the term of this patent is extended or adjusted under 35 U.S.C. 154(b) by 95 days.

(21) Appl. No.: 16/762,931

(22) PCT Filed: Nov. 21, 2017

(86) PCT No.: PCT/IL2017/051268
§ 371 (c)(1),
(2) Date: May 10, 2020

(87) PCT Pub. No.: WO2019/102449
PCT Pub. Date: May 31, 2019

(65) Prior Publication Data
US 2020/0392934 A1    Dec. 17, 2020

(51) Int. Cl.
*F03B 13/18* (2006.01)
*F16H 61/452* (2010.01)

(52) U.S. Cl.
CPC ....... *F03B 13/1815* (2013.01); *F16H 61/452* (2013.01); *F05B 2260/406* (2013.01)

(58) Field of Classification Search
CPC ............... F03B 13/1815; F16H 61/452; F05B 2260/406
USPC .......................................... 290/42, 43, 53, 54
See application file for complete search history.

(56) References Cited

U.S. PATENT DOCUMENTS 8,525,365 B2 *  9/2013 Lama ................... F03B 13/182
                                                    290/54
8,614,522 B2 * 12/2013 Hahmann ............. F16H 61/475
                                                    290/54

FOREIGN PATENT DOCUMENTS

EP      1678419 B1 *  8/2012 ............. F03B 11/06
EP      1678419 B1    8/2012

* cited by examiner

*Primary Examiner* — Charles Reid, Jr.

(57) ABSTRACT

A sea wave power plant for generating electricity, and for supplying high pressure fluids to a water purification system. The power plant includes two compartments adjustable differential hydro cylinders that are assembled on floaters, an axial piston variable motor, a system for protecting the floaters in periods of storm in a way that the floater are positioned horizontally outside the water, and an automation sub-system. The wave power plant is combined of several modular units that each one of them serves as independent sea water power plan.

5 Claims, 8 Drawing Sheets

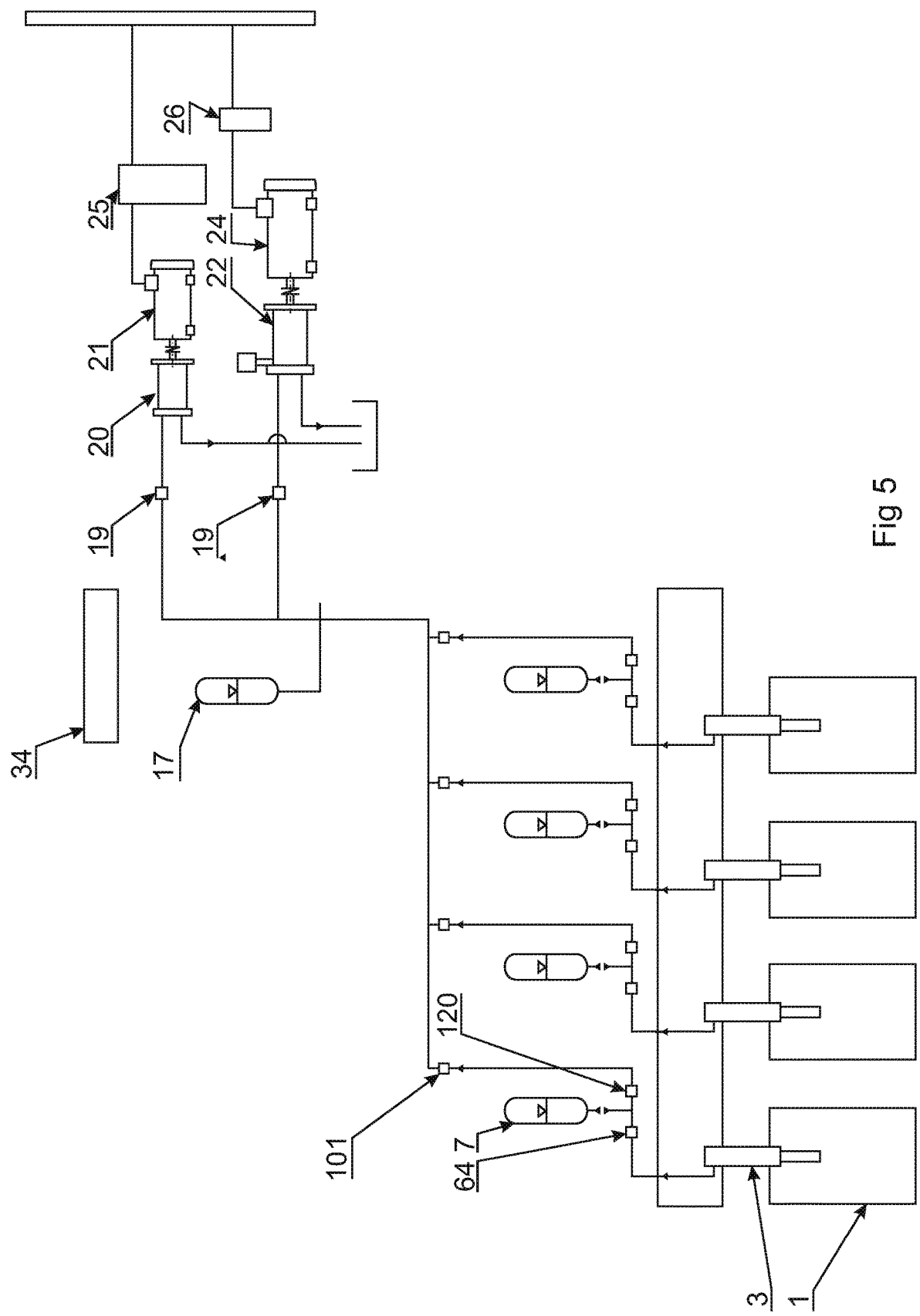

EFFECTIVE WAVE POWER PLANT FOR PRODUCTION OF CLEAN ELECTRICITY OR CLEAN WATER FROM THE WAVES OR A COMBINED SYSTEM

RELATED APPLICATIONS

This application is a National Phase of PCT Patent Application No. PCT/IL2017/051268 having International filing date of 21 Nov. 2017. The contents of the above applications are all incorporated by reference as if fully set forth herein in their entirety.

TECHNICAL FIELD

The main objective of this invention is an overall system for the production of clean electricity and potentially clean water from the pressure generated by the waves.

BACKGROUND ART

One of the most widely accepted methods for wave energy generation is the hydraulic method. In this method there is a hydro cylinder, which is connected to a floater. In such case, the hydro cylinder acts as a pump, which is pumping high pressurized oil (or any other liquid) to the hydro motor, which turns the oil pressure to rotational movement, which is then turns the generator, that creates electricity and or clean drinking water.

The disadvantages of this standard and widely used system is this has low efficiency due to very limited range of work for the system. Meaning that the system can operate only in certain wave conditions and therefore it does not generate sufficient electricity or drinking water amounts, in comparison to the construction prices.

In addition, as to desalination, the most expensive element in the desalination process is the electrical source that is used to create that pressure which is needed for the process itself. Once the electrical source for the pressure creation is the waves, then the tremendous electricity costs are saved and when the electricity produced by the plant is not needed it can divert itself to production of desalinated water.

The system that will be presented hereto efficiently handles such disadvantages. The proposed system has a lower cost both for electricity production and for desalination, higher range of use in different wave patterns, higher working efficiency of the overall system and easier construction, installation and maintenance of the system.

DESCRIPTION OF DRAWINGS

The intention of the drawings attached to the application is not to limit the scope of the invention and its implementation. The drawings are intended only to illustrate the invention and they constitute only one of many possibilities for its implementation.

FIG. 5 illustrate the solution for multiple floaters synchronization.

THE INVENTION

We first describe the entire power station and its' method of operation, which enables to efficiently convert the energy of sea waves into significant amounts of electricity and or clean water and or combined, followed by the proposed power station's unique components.

The main objective of the invention is to provide a comprehensive system for generation of electricity and/or clean water from the waves, and or a combined system that can generate both clean electricity and clean water from the waves, and which operates as follows:

The floater (1) connects to any type of structure, may direct itself to face the waves, and makes oscillating motions along the axis of the floater's arm (2) i.e. a power stroke up and a power stoke down; in such way, a certain mechanical momentum is created on the arm due to Archimedes force, as well as the floater (1) weight and such force is transmitted to the hydro cylinder (3). The hydro cylinder may be adjustable and movable on the floater's arm for increased efficiency and higher reliability.

The number of working hydro cylinders (3) can vary depending on constructive expediency and can be one or more for various configurations and ocean structures.

Figure 2A:
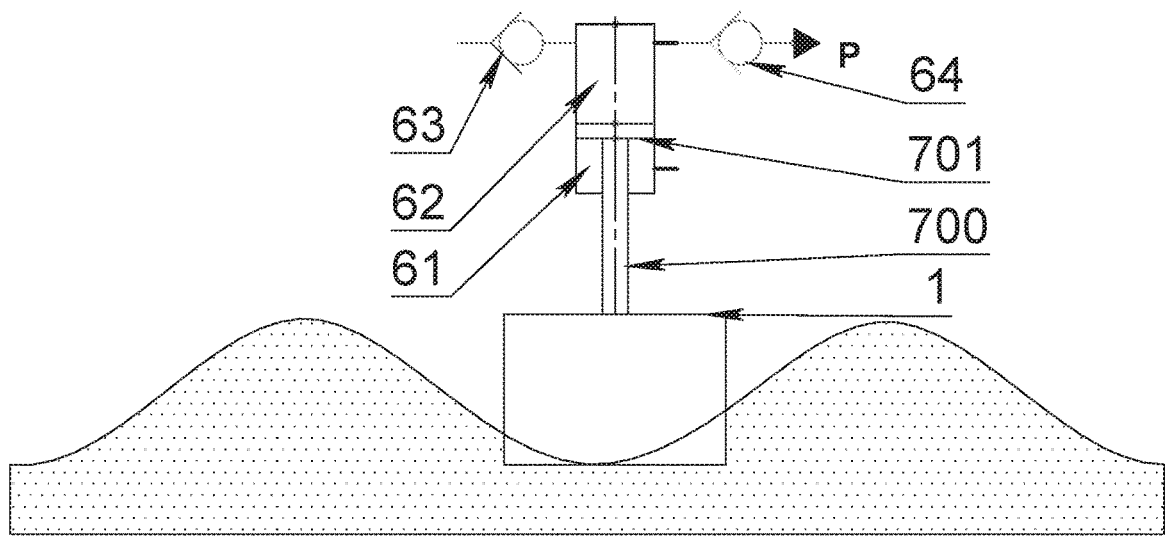
FIG. 2A shows the hydro cylinder status (3) when the wave is in its lowest position relative to the floater (1)

In FIG. 2A, we can see that in order for the hydro cylinder (3) to operate as a pump, we install a number of check valves (63,64). During the descent of the floater (1), the hydraulic liquid accumulates in the under pressure area (62) (hereinafter "the main chamber") of the hydro cylinder (3). In the elevation of the floater, the volume of the main chamber 62 (in FIG. 2A) becomes smaller, check valve (63) is closed and check valve (64) opens and then the oil flows to the high pressure line (12).

Figure 2B:
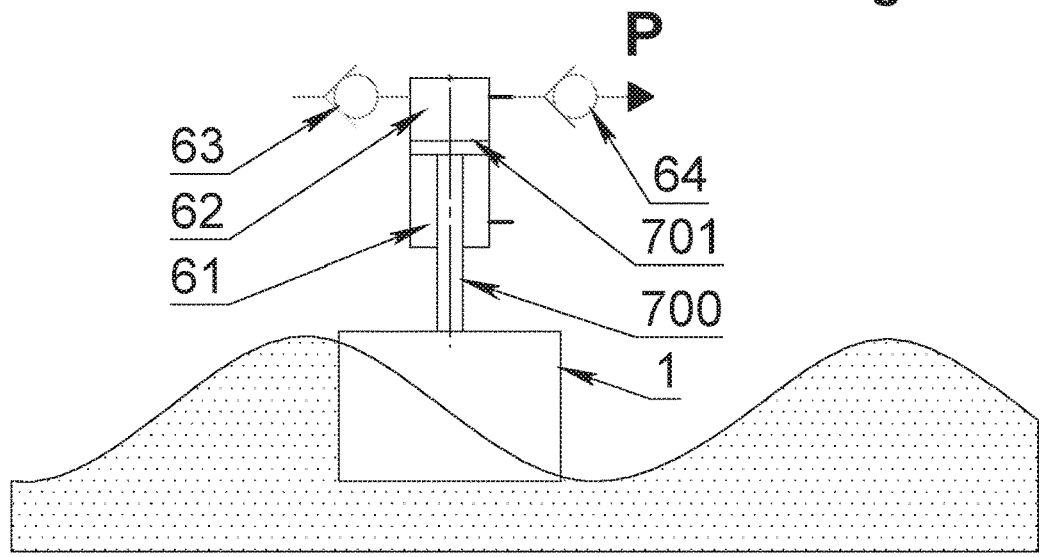
FIG. 2B shows the hydro cylinder status when the floater (1) is being elevated by the wave.
Figure 2C:
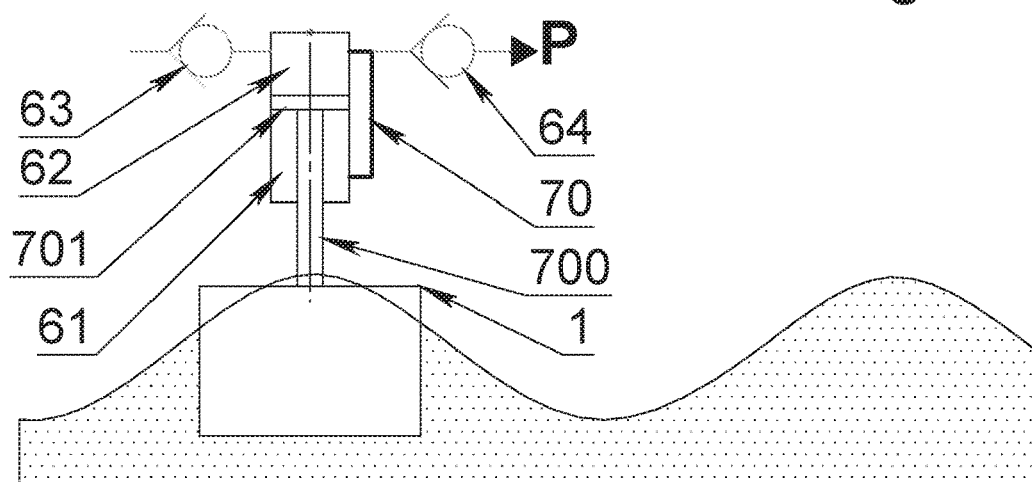
FIG. 2C shows the hydro cylinder status when the wave is in its highest position relative to the floater (1)

In order to maximize the efficiency of the overall system, and to create higher pressure in different wave heights' in operation mode, the automation can connect between volumes of the main chamber 62 and the secondary chamber 61 (in FIG. 2C) in the hydro cylinder, using a selector (70). Now, when the floater is going up, the total volume of the main and the secondary chambers (62+61) of the hydro cylinder decreases to the size of the piston rod (700) of the piston (701) in FIGS. 2A, 2B and 2C, that separates chamber 62 from chamber 61, and this raises the created pressure to at least double the pressure, which enables us to operate in lower waves and to synchronize between a numbers of floaters which generate different pressures.

On standard power strokes, it pumps hydraulic liquid into the high pressure line (12) of the power station, and goes through check valve (101), which prevents a backflow of hydraulic liquid from the hydraulic accumulators (17) to the hydro cylinder (3) and then some of the hydraulic fluid continues to the collector (16) and into hydraulic accumulators (17). The automation system (34) keeps some of the pressurized hydraulic fluid in the accumulators, to be used for stabilization and released into the hydro motor in case of a long time period between one wave and another and it sends the rest of the pressurized hydraulic liquid to the hydro motor or hydro motors (20,22) and some of the hydraulic liquid (in case of stable waves) continues directly to the hydro motor (20,22) through an automatically controlled flow control valve (19), which is also controlled by the automation system and assists in regulating the RPM of the hydro motor.

In order not to lose any energy from shock waves, which happens very unexpectedly and very rapidly and causes a very high power stroke the oil may be partially captured and accumulated in accumulator (7) to be located in nearest proximity to the floater.

The hydro motor converts a stream of the hydraulic pressurized liquid to an angular momentum on the shaft. Waste hydraulic liquid without pressure flows back into the hydraulic tank (28).

The shaft of the hydraulic motor (20,22) is mechanically connected to the generator (21,24) and upon activation of the hydraulic motor, an angular momentum is transmitted directly to the generator, which produces electric current.

Figure 1A:
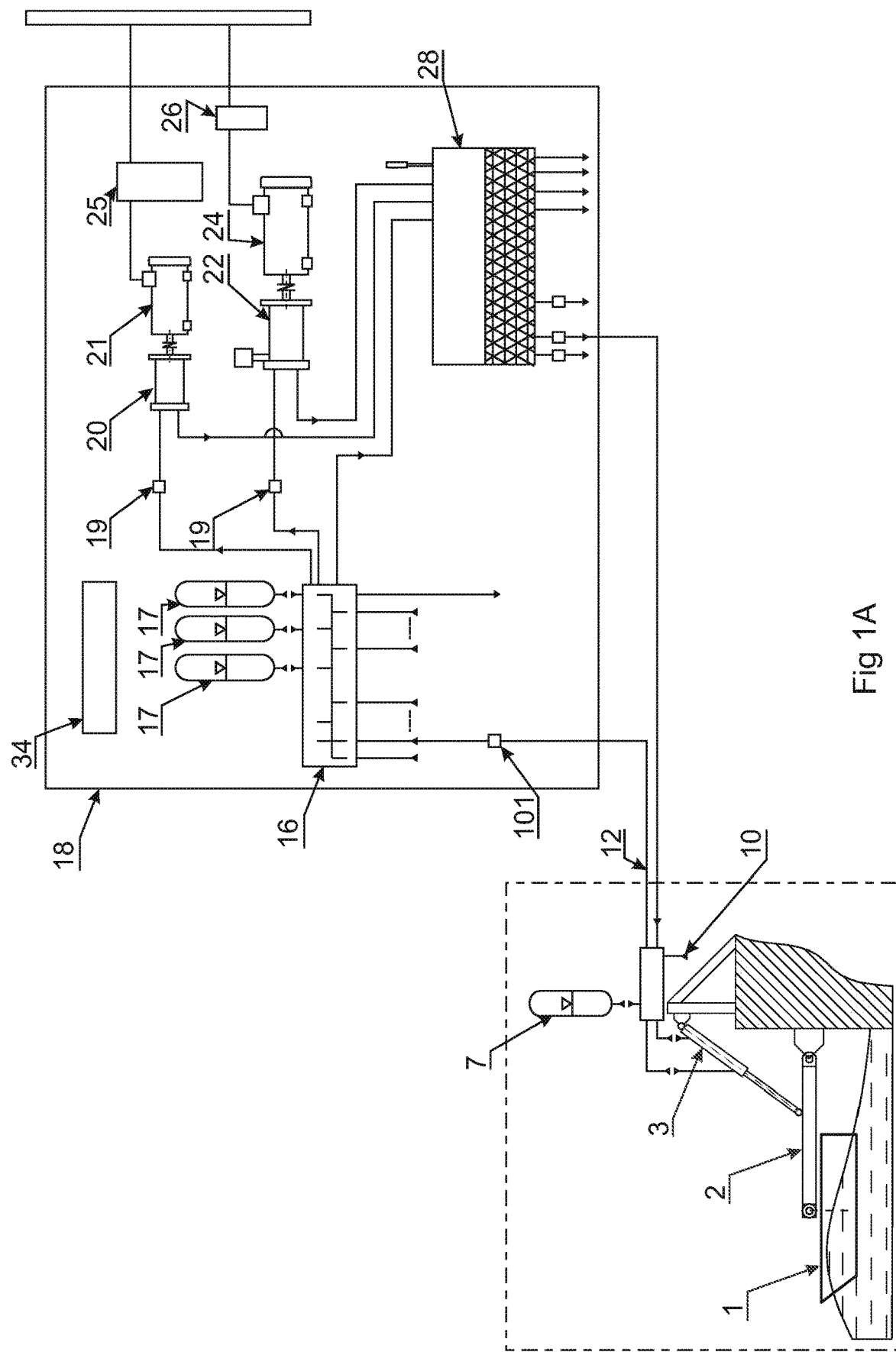
FIGS. 1A-1C portrays general scheme of the overall power station, which can produce electricity or clean (desalinated) water or electricity combined with clean (desalinated) water.
Figure 1B:
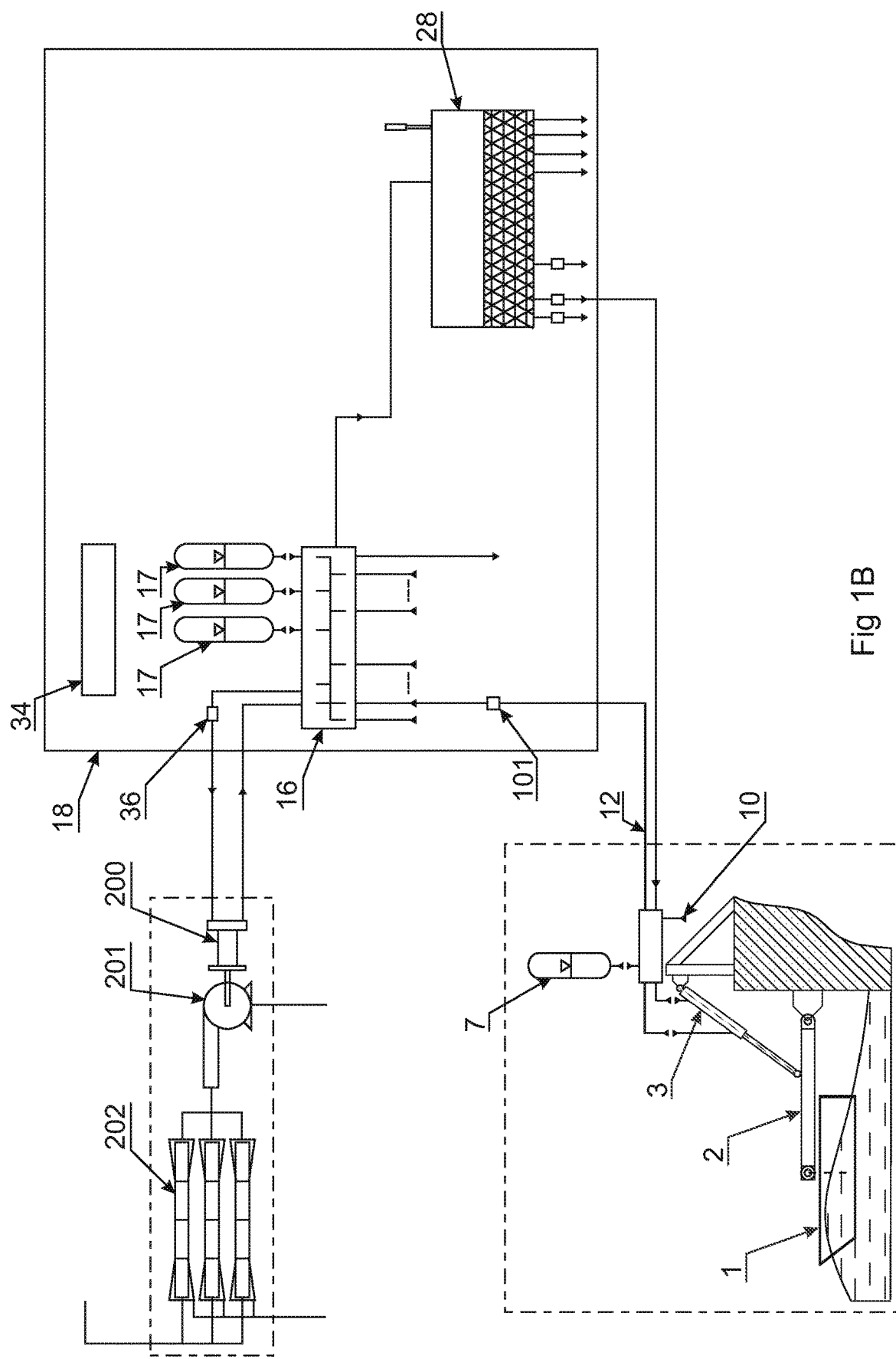
Figure 1C:
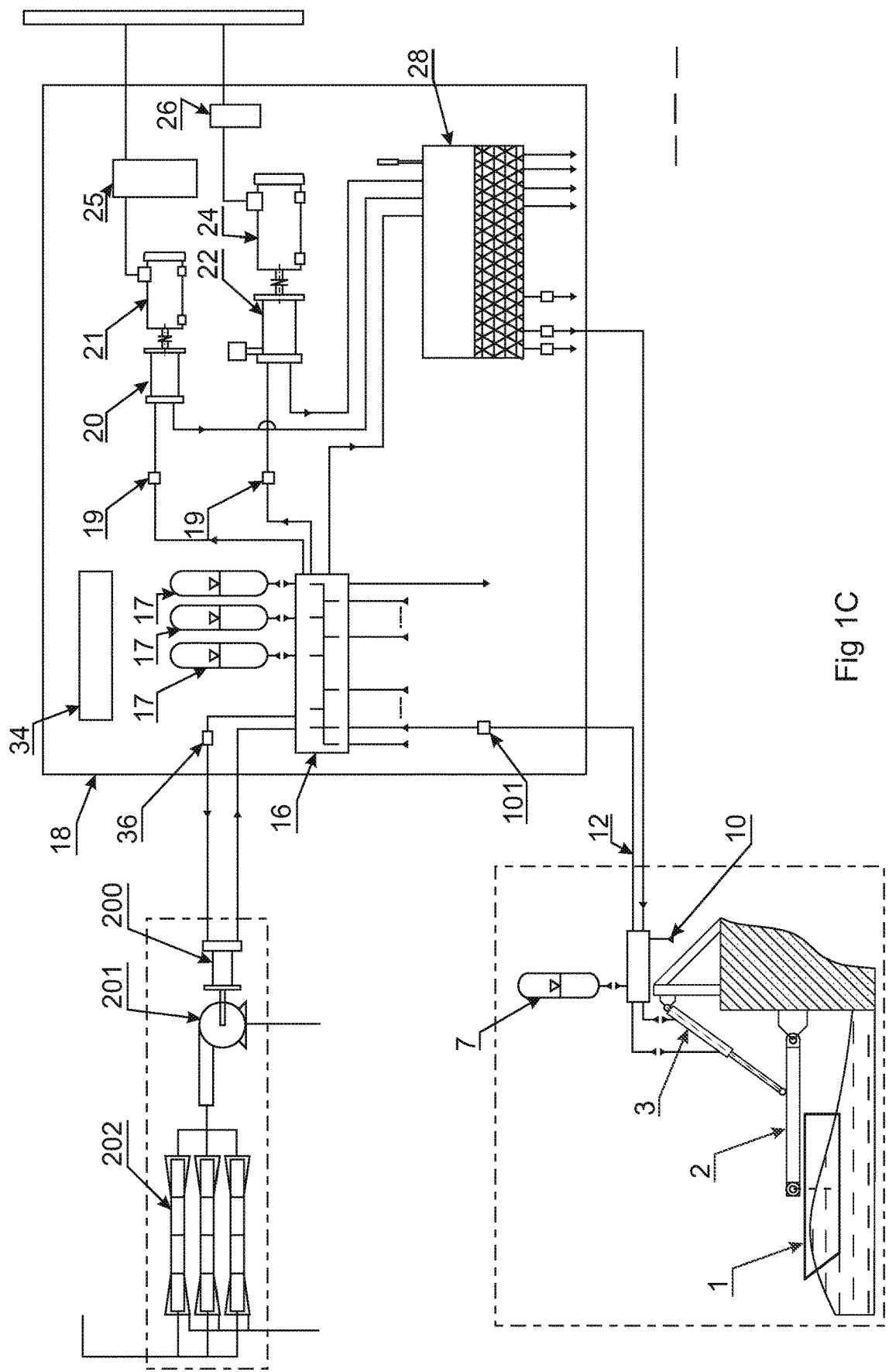

In each modular unit, slave modular unit (18) or main modular unit (300), there might be one or more hydro motors and one or more generators. Such hydro motors and generators are of different capacity, one set of small capacity for low waves, and one set of large capacity for higher waves. In FIG. 1, the smaller hydro motor (20) is coupled with a smaller generator (21) and a larger capacity hydro motor (22) is coupled with a larger scale capacity generator (24). The automation (34) constantly measures the pressure in the accumulators (17) and in accordance with the accumulated pressure decides whether to activate the system with the smaller capacity output, or to activate the system with the higher capacity output, or in case of extremely high waves and high pressure to activate both sets in parallel. The advantage of two sizes of hydro motors and generators in each modular unit (18) or (300) is the fact that higher efficiency can be reached, because in case of low waves there are less energy loses turning a smaller scale hydro motor and generator.

Since parameters of current produced by the asynchronous generator (21) can vary within certain limits depending on RPM, we can either use an inverter (25) controlled by an automation system in order to stabilize and standardize frequency and voltage of output current, which is eventually delivered to the end user or we can use synchronic generator (24), which does not require an inverter, as is controlled by synchronization system (26) to the grid (33)

In order to have the possibility to utilize synchronous generator (24), control the RPM, and eliminate the need of an inverter (25), we can utilize axial piston variable motor (22), which can modify its' volume according to continuous commands it receives from the automation system (34). The Automation system (34) measures the pressure in the accumulators (17) and calculates the quantity of hydraulic fluid in the accumulators (17). If this hydraulic fluid is not sufficient for the stable operation of the hydro motor (22) then the automation will control the hydro motor and minimize its's operational volume, and Vis versa. Due to the possibility to modify the volume of the hydro motor, it enables us to control the moment on the shaft of the hydro motor, and combined with flow control valve (19) it enables us to support the necessary moment and RPM which is necessary for the synchronic generator.

In order for the same system to also generate clean water, the process remains the same till it reaches the accumulators (17), which means that The floater (1) connects to any type of structure, and makes oscillating motions along the axis of the floater's arm (2) i.e. a power stroke up and a power stoke down; in such way, a certain mechanical momentum is created on the arm due to Archimedes force, as well as the floater (1) weight and such force is transmitted to the hydro cylinder (3).

The number of working hydro cylinders (3) can vary depending on constructive expediency and can be one or more for various configurations and ocean structures. On standard power strokes, it pumps hydraulic liquid into the high pressure line (12) of the power station, and goes through check valve (101), which prevents a backflow of hydraulic liquid from the hydraulic accumulators (17) to the hydro cylinder (3) and the hydraulic fluid continues to the collector (16). Some of the hydraulic fluid from the collector is going into the accumulators (17), to stabilize the system in case of longer wave period and some of the pressurized hydraulic liquid will go through flow control valve (36).

After control valve (36), the pressurized hydraulic fluid continues to a hydro motor (200), which is used to rotate high pressure pump (201) which feeds marine salt water into membrane modules (202), and we can clean water.

Figure 4:
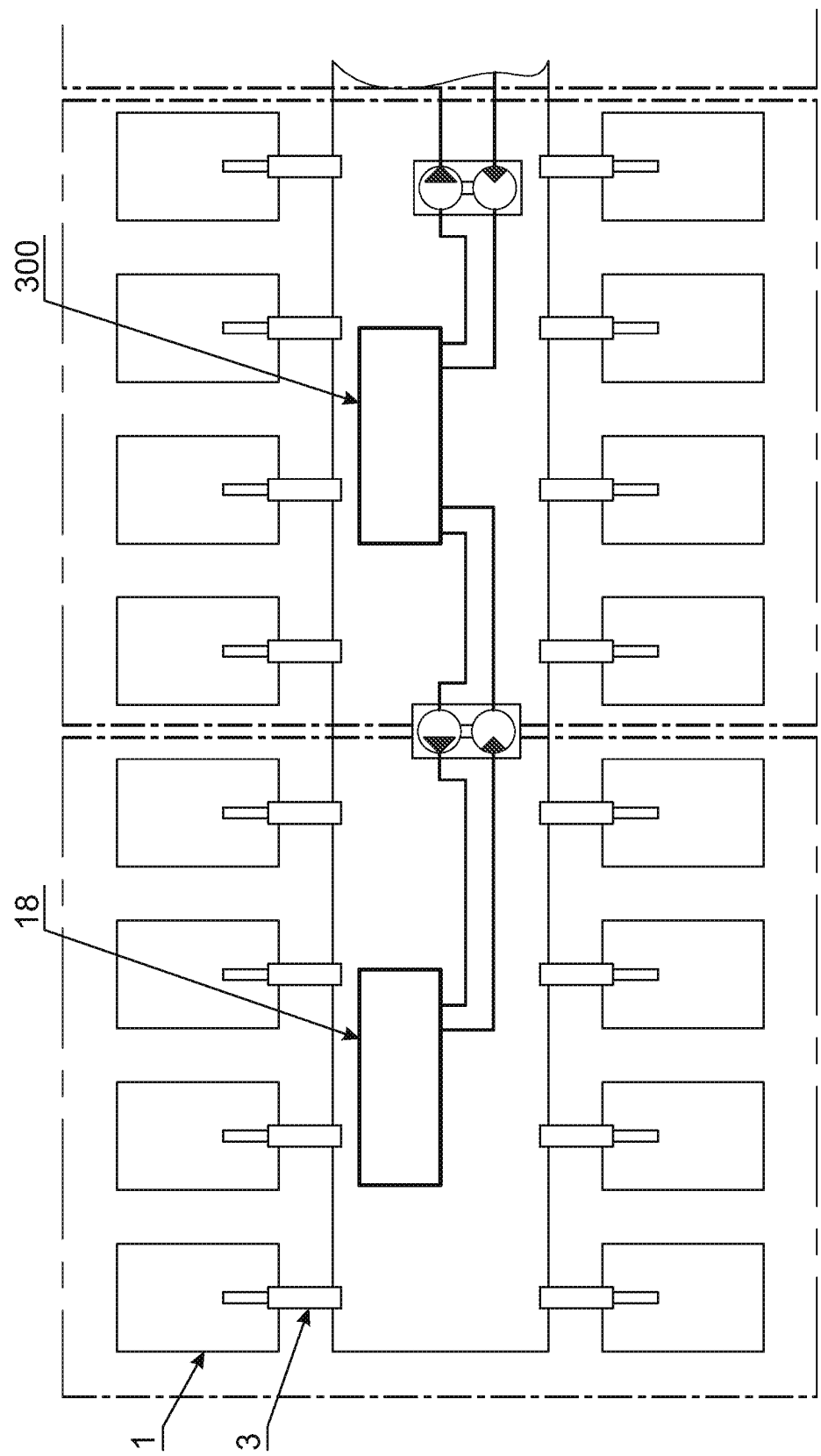
FIG. 4 illustrates the possibility to unite different modules, in order to work more efficiently in lower waves.

The system that is shown of FIG. 1 is fully modular, in order to enable easy construction and maintenance. As a result, in order to achieve a large scale of energy and water supply systems we have to install a number of modular units (18) and (300). with the same components in each unit. In case of low waves, when we do not have enough wave height for the operation of each unit separately, we can unite the hydro systems of one or few units. In FIG. 4, we illustrate that we can unite and combine the hydraulic of both modular units (18 and 300). In this case, the floaters of modular unit A (18) will create pressure and fill its' own accumulators. However, when the automation system recognizes that the wave heights are too low for each system to operate independently, then modular unit A (18) will commence transferring its' pressurized hydraulic fluid into neighboring modular unit (300). As a result, we can reach higher production levels.

Each modular unit (18) and (300) can have one or more floaters connected to it. In case of multiple floaters connected to the same unit, there might occur an issue of floaters synchronization. Each floater (1) is exposed to different wave heights, as a result, each floater will create different pressure. The problem in such case is that the floater that creates the highest pressure will take over the hydraulic system and will not let the pressure from other floaters to get into the hydraulic system, as higher pressure blocks lower pressures. As a result, one of the additional rolls of the automation system is to measure the pressure in the main accumulators (17) and accumulator (7), when the pressure in accumulator (7) is higher than the pressure in the main accumulators (17), then on/off switch (120) opens and the oil from accumulator (7) is allowed to enter the main accumulators (17)

In order for the system to also be able to survive storms and high waves and winds regimes, the proposed system is also equipped with storm protection mechanisms which provides three protection modes to the floaters.

Figure 3A:
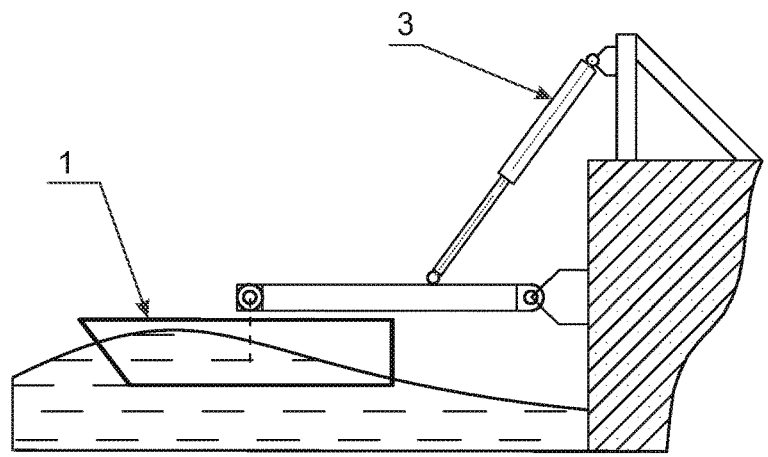
FIG. 3A shows floater's (1) regular operation in normal wave conditions.
Figure 3B:
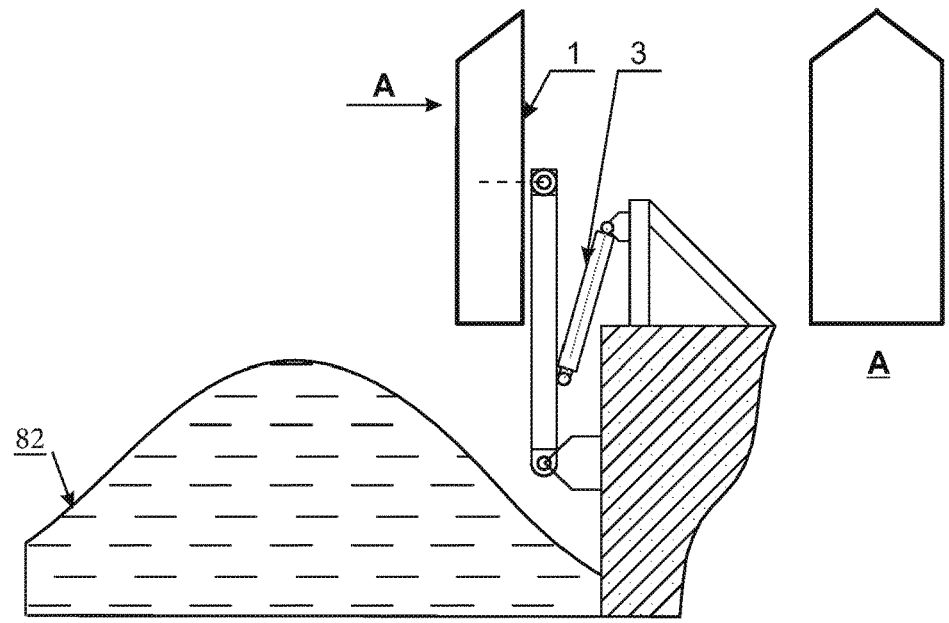
FIG. 3B shows a method for protecting the floater (1) by elevating it above the water level
Figure 3C:
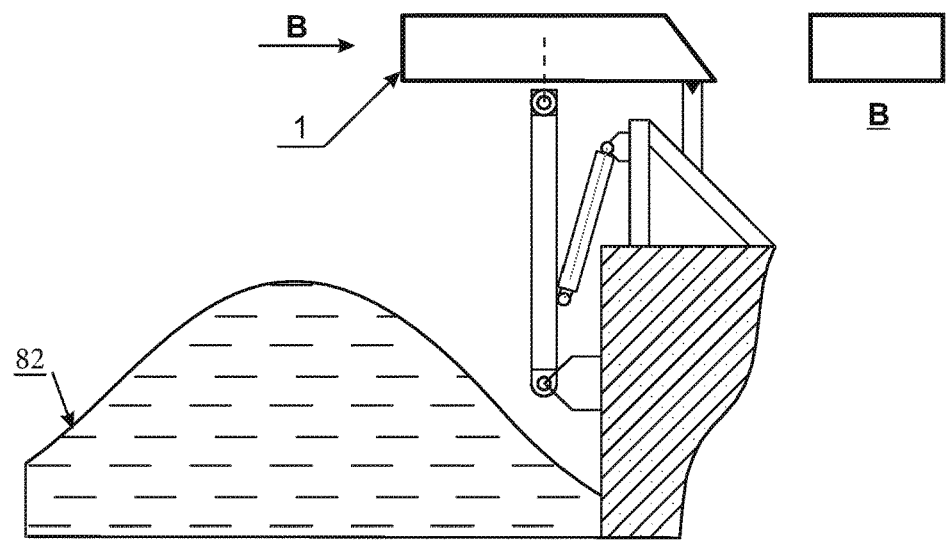
FIG. 3C shows a method for protecting the floater (1) by elevating it above the water level and rotating it to minimize exposed surface.

FIG. 3B illustrates a floater (1) in the upward vertical position (preferably higher than the standard maximal height of the wave (82)). This kind of protection mode enables us to lift the floater during a storm (waves that are too high for the system to handle) and protect it in a non-operational mode, till the storm passes. FIG. 3C illustrates a floater in an upward horizontal position (preferably higher than the standard maximal height of the wave (82)). This kind of protection mode enables us to lift the floater horizontally and lock it, and by doing so we decrease the surface on which the waves and winds are acting. By decreasing such surface decreases the potential damages during storms.

The lifting process is occurring with the utilization of the hydro cylinder (3). Pressure is pumped from the hydraulic accumulators (17) to the secondary chamber of the working hydro cylinder, which lifts the floater from the working area to the storm protection area. In case there is no pressure in the power station, then we can also connect to the pressurized airport (10) a suitable sort of pressurized gas in order to create the pressure and lift the floaters or create pressure with the use of an external electrical source.

Figure 3D:
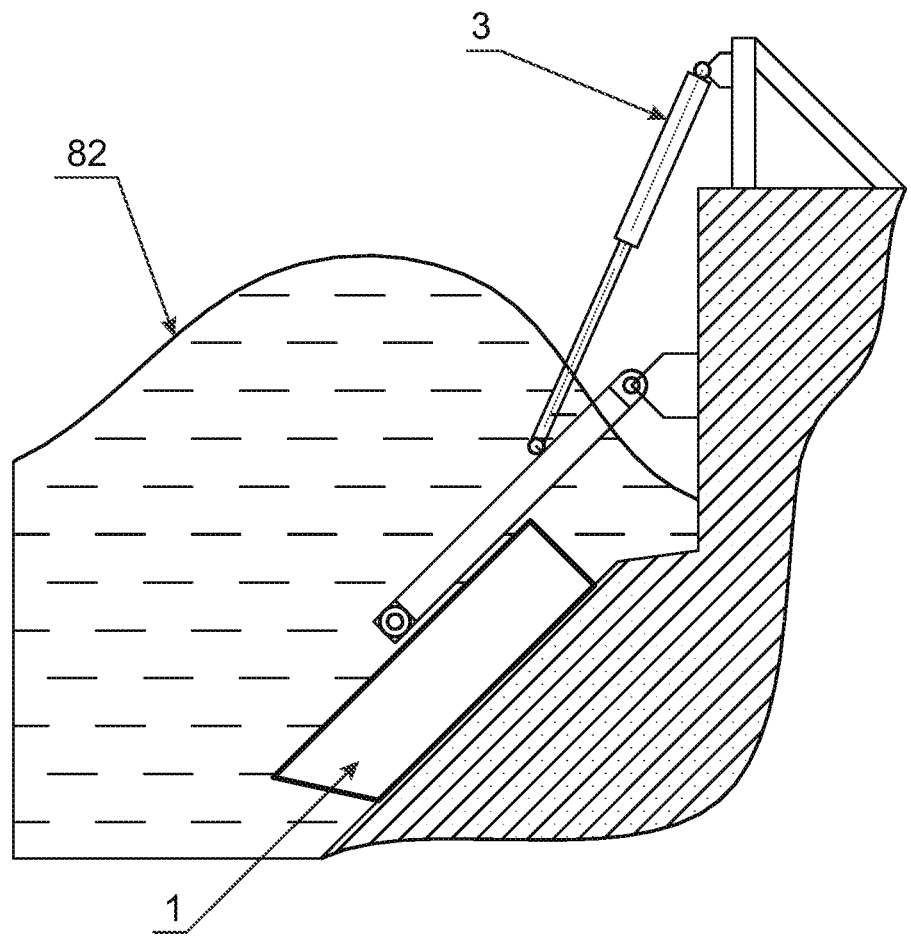
FIG. 3D shows a method for protecting the floater (1) by sinking it under the water level

Another method of protecting the floater is extreme wave condition is to submerge it, as illustrated in FIG. 3D. The floater (1) can be submerged by fastening it to the structure or to the ocean floor, depending on the depth. The submerging process can occur either by flooding the floater (1) with water or when using a double-cylinder, the arm (2) may be pushed downward. When the storm subsides, the floater can be raised by pumping compressed air through the compressed air port (10).

The whole system is controlled by an automation (34), which continuously measures the different characteristics of the system such as but not limited to: pressure in the hydro cylinders, hydro cylinder displacement, pressure in the accumulators, RPM in the hydro motors and hydraulic liquid flow and in accordance with such measurements the automation independently decides whether to increase or decrease the volume of the hydro cylinder, controls the proper volume of the hydro motor, decides whether to operate the smaller or bigger generator or both, whether to bring the floaters to storm protection mode and switches between the energy production vs water production mode or both, in accordance with the wave heights and the needs. In addition, the automation system can handle the floater's synchronization between different pressures.

What is claimed is:

1. A sea wave power plant that comprises a floater (1), a hydro cylinder (3), an accumulator (17), a hydro motor (22), a generator (24) that is associated with the hydro cylinder (3), and an automation system (34);
    wherein the hydro cylinder (3) includes a main chamber (62) and a secondary chamber (61) that are separated by a piston (701) that is connected to a piston rod (700), wherein the hydro cylinder (3) is designed to compress oil from the main chamber (62) to the accumulator (17);
    wherein the main chamber (62) is designed to contain oil and is further designed to be connected to a high pressure line (12) by a first valve (64) and to a hydraulic tank (28) by a second valve (63),
    wherein when the floater (1) rises upwards the piston rod (700) is designed to be pushed inwards and to reduce a volume of the main chamber (62) so that the oil from the main chamber (62) can flow to the high pressure line (12) through the first valve (64);
    wherein the main chamber (62) and the secondary chamber (61) are connected by a selector (70) that is capable to enable the oil in the main chamber to flow from the main chamber (62) to the secondary chamber (61) when the piston rod (700) is pushed inwards, so that the volume of oil that flows into the high pressure line (12) is equal to a volume of the part of the piston rod (700) that penetrates inside the secondary chamber (61).

2. The sea wave power plant of claim 1, wherein said hydro motor (22) is a variable volume hydro motor (22) that is designed to modify an operational volume of the variable volume hydro motor according to commands received from said automation system (34);
    wherein said automation system (34) is designed to measure pressure in said accumulator (17) and to send a command to the variable volume hydro motor (22) to change the operational volume of the variable volume hydro motor according to a measured pressure;
    wherein the variable volume hydro motor (22) is designed to work on a constant RPM in different operational volumes, so that said constant RPM enables said generator (24) to generate constant and stabilized electrical current.

3. The sea wave power plant of claim 1, that further comprises an independent main modular unit (300) and an independent slave modular unit (18), wherein each modular unit is designed to serve as an independent sea wave power plant and comprises a floater (1), a hydro cylinder (3), an accumulator (17), a hydro motor (22), and a generator (24);
    wherein the slave modular unit (18) is designed to stream its pressurized hydraulic fluids from the slave modular unit to the main modular unit (300) according to command from said automation system (34) that is designed to measure hydraulic fluids pressure at real time in the main modular unit (300) and in the slave modular unit (18), wherein the automation system (34) is designed to send the command to the slave modular unit (18) to stream the pressurized hydraulic fluids from the slave modular unit to the main modular unit (300) in case of low sea wave level.

4. The sea wave power plant of claim 1, wherein said hydro cylinder (3) is further designed to intake oil from said accumulator (17) into said secondary chamber (61) wherein the oil can flow into said secondary chamber and can push upwards said piston (701) and said piston rod (700), and wherein said floater (1) that is connected to the piston rod (701) is lifted outside the water.

5. The sea wave power plant of claim 1, further include a small capacity hydro motor (20) that is associated with a small capacity generator (21); wherein said automation system (34) is designed to measure pressure in said accumulator and in the hydro motors accordingly to activate said hydro motor (22) and deactivate the small capacity hydro motor (20), or to activated the small capacity hydro motor (20) and deactivate the hydro motor (22).

\* \* \* \* \*